United States Patent [19]

Swistak

[11] Patent Number: 4,814,985
[45] Date of Patent: Mar. 21, 1989

[54] SALES LIMIT INDICATOR FOR AN ELECTRONIC CASH REGISTER

[76] Inventor: Irene Swistak, 51 Carl St., Meriden, Conn. 06450

[21] Appl. No.: 29,139

[22] Filed: Mar. 23, 1987

[51] Int. Cl.[4] .............................................. G07G 1/12
[52] U.S. Cl. .................................................... 364/405
[58] Field of Search ........................................ 364/405

[56] References Cited

U.S. PATENT DOCUMENTS

| | | |
|---|---|---|
| 3,944,801 | 3/1976 | Montana . |
| 3,946,220 | 3/1976 | Brobeck et al. . |
| 4,068,213 | 1/1978 | Nakamura ................... 340/149 A |
| 4,159,533 | 6/1987 | Sakurai . |
| 4,319,326 | 3/1982 | Uchida . |
| 4,389,707 | 6/1983 | Tsuzuki . |
| 4,493,037 | 1/1985 | Takano et al. . |
| 4,628,452 | 12/1986 | Shiono ................................ 364/405 |
| 4,635,196 | 1/1987 | Nakamura ......................... 364/405 |

FOREIGN PATENT DOCUMENTS

| | | | |
|---|---|---|---|
| 0166765 | 12/1980 | Japan .................................. 364/405 |
| 0105377 | 6/1983 | Japan .................................. 364/405 |
| 0024368 | 2/1984 | Japan .................................. 364/405 |
| 0208670 | 11/1984 | Japan .................................. 364/405 |

Primary Examiner—Jerry Smith
Assistant Examiner—Steven G. Kibby
Attorney, Agent, or Firm—Chilton, Alix & Van Kirk

[57] ABSTRACT

A conventional cash register unit is modified to include a cashier input unit having a switch and/or keys or the like for entering a limit value equal to the maximum total bill authorized for a given transaction by an individual customer. A limit indicator unit is coupled to the cashier unit for generating a signal to the clerk and the customer when the accumulated total, including tax, is within a predetermined margin of the limit value. Preferably, the limit indicating unit displays several kinds of information, including the authorized limit value, the running total of the accumulated bill, an alarm signal indicating that the accumulating amount is within a predetermined margin of the authorized limit, as well as a limit signal indicating when the authorized limit has been reached. Also, the price of each item may be displayed.

6 Claims, 3 Drawing Sheets

SALES LIMIT INDICATOR FOR AN ELECTRONIC CASH REGISTER

BACKGROUND OF THE INVENTION

This invention relates to a retail cash register or terminal, and more particularly, to the type of cash register used in grocery markets and the like.

The typical sales transaction in a grocery market involves the purchase of dozens of individual items, each having a different price and, in some cases, multiple units. Since grocery shopping is a necessity for nearly every family or living unit, and must be performed on a continual basis, the weekly or monthly cost of food purchased at a grocery is a major item in the domestic budget. Thus, many shoppers enter the grocery market with a fixed limit on the amount of money they can spend for groceries during a given transaction.

For those shoppers who are limited in the amount they can spend during a given transaction, the fact that dozens of items are typically purchased during a transaction makes it difficult to monitor, while shopping, the total price represented by the accumulated prices of the items the shopper removes from the shelf and places in the shopping basket. Although a pocket calculator or the like could be carried by the shopper and the price of each item entered as the item is placed in the shopping basket, only a small fraction of shoppers can be expected to devote the effort and care required to accurately record dozens of items in this fashion.

As a result of the foregoing factors, it is a common occurrence in almost every grocery market for a shopper to fill the shopping cart with items having a total price that exceeds the amount of money the shopper has brought to the market or can otherwise afford to pay. This disparity often does not become evident until the cashier has entered all items in the cash register and obtained a total bill for presentation to the customer. At that moment, the customer realizes that he or she cannot pay for all the items purchased, and that some items must therefore be deleted from the transaction.

The typical procedure for deleting items from a completed transaction requires that the cashier call the store manager, fill out a form to void the cash register entries corresponding to the items to be returned, and make a series of voiding entries in the register. In busy markets, where several shoppers can be in line for each register, the delays associated with voiding items to be returned due to the shopper's exceeding his monetary limit, can be frustrating to other shoppers and the cashier, embarrassing to the customer, and generally disruptive to the smooth and efficient checkout operation of the market.

SUMMARY OF THE INVENTION

It is an object of the present invention to provide a system associated with a retail cash register, for permitting the customer to establish a limit on the total price for a given transaction and for indicating to the customer when the accumulated total price of the items purchased approaches or is equal to the established limit.

In accordance with the invention, a conventional cash register unit is modified to include a cashier input unit having a switch and/or keys or the like for entering a limit value equal to the maximum total bill authorized for a given transaction by an individual customer. A limit indicator unit is coupled to the cashier unit for generating a signal to the clerk and the customer when the accumulated total is within a predetermined set point of the limit value. Preferably, the limit indicating unit displays several kinds of information, including the authorized limit value, the running total of the accumulated bill, an alarm signal indicating that the accumulated amount is within a predetermined margin to the authorized limit, as well as a limit signal indicating when the authorized limit has been reached. Also, the price of each item may be displayed.

In the preferred embodiment, wherein an alarm signal is generated when the accumulated bill is within a preselected margin to the authorized limit, the customer has some flexibility to chose the most important items remaining in the shopping basket. This significantly reduces the likelihood that a shopper would request the return of items that have already been entered in the register, with the resulting necessity to void such items.

The present invention can be implemented in a variety of physical embodiments. If incorporated into the design of a new cash register, the limit indicating unit can be a part of the cash register, with the display windows or indicators being visible to both the customer and the cashier. If incorporated as an add-on enhancement to existing cash registers, the limit indicating unit would typically be in the form of a small box or the like located between the existing cash register and the customer, with one set of display windows or alarms visible to both the customer and the cashier, or two sets, one set facing the cashier and the other set facing the customer.

BRIEF DESCRIPTION OF THE DRAWINGS

Additional features and advantages of the invention will be set forth below in connection with the description of the preferred embodiment and reference to the accompanying drawings, in which.

DESCRIPTION OF THE PREFERRED EMBODIMENT

Figure 1:
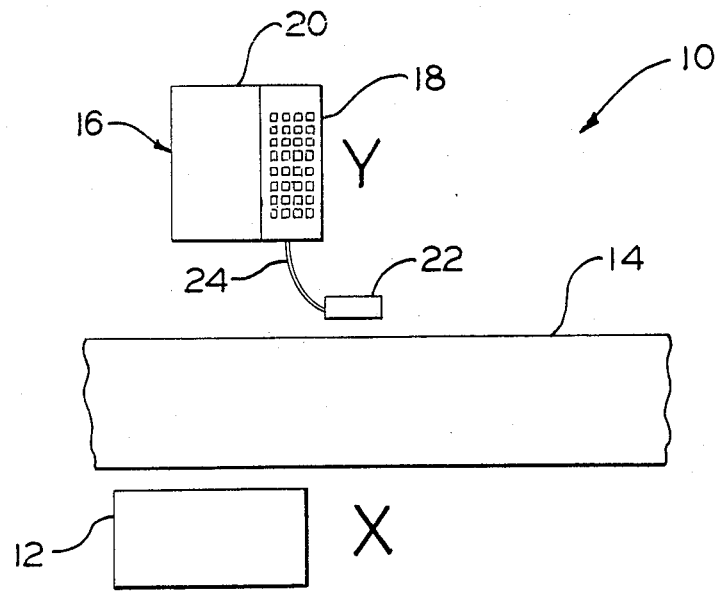
FIG. 1 is a schematic layout of a typical checkout area of a grocery store or market showing one possible location for the present invention.

FIG. 1 shows a typical "checkout counter" 10 in a supermarket, where a customer indicated at X has wheeled a cart 12 alongside a conveyer 14 which transports the individual items to be purchased (not shown) to the cashier indicated at Y. The cash register 16 conventionally includes electromechanical devices for recording the price of each item to be purchased during a transaction and computing a total bill to be given to the customer at the end of the transaction. The register typically includes an input/output section 18 containing switches, keys, display windows, and the like by which the cashier enters the data and otherwise interacts with the main section 20 of the cash register.

In accordance with one aspect of the invention, a limit indicating unit 22 is coupled by a cable 24 to the input/output section of the register, for storing a running total of the accumulated bill represented by the prices of the items entered by the cashier into the cash register. Prior to the entry of the first item, the cashier would ask the customer whether the transaction should have a limit value such that the customer will not inadvertently attempt to purchase more items than he or she can pay for. If a limit value is authorized, such value is entered by the cashier through the input/output section 18 of the register. As the transaction proceeds, a comparison is made within the limit indicating unit 22, of the limit value and the accumulated running total, and a limit signal is generated to the cashier and the customer when the accumulated total is within a predetermined set point of the limit value.

Figure 2:
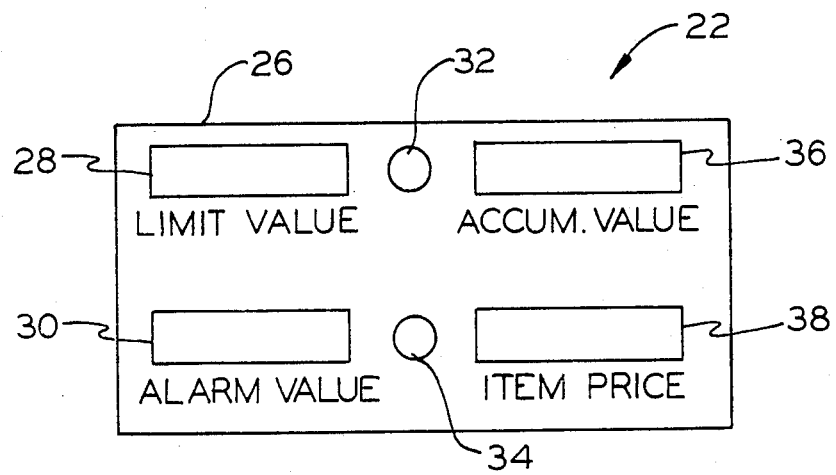
FIG. 2 is a detailed view of the preferred display unit associated with the preferred embodiment of the invention.

FIG. 2 illustrates a preferred display panel 26 for the limit including unit 22. When the customer states a limit value, the cashier enters this value and the limit value appears in the corresponding display window 28. The unit preferably stores a default margin amount of, for example, five dollars, so that an alarm value five dollars less than the limit value would appear in the alarm window 30. If the customer desires a different margin, the margin, for example ten dollars, can be entered by the cashier and the resulting alarm value will appear in the alarm window. The limit value window and the alarm value window can have threshold indications, such as two different illumination colors or separate colored lights, for indicating when a limit value or alarm value has been reached. In FIG. 2, the limit value light 32 would be red, and the alarm value light 34 would be amber. Another window 36 is provided for displaying the accumulated value, or running total of the items that have been entered into the cash register. Also, a window 38 for displaying the price of each item as it is accumulated can be provided. Preferably, the display panel shown in FIG. 2 would either be visible to both the customer and the cashier, or the limit indicating unit would have two display panels.

It should be appreciated that the arrangement shown in FIG. 1 and 2 is suitable for enhancing an existing cash register, or slightly modifying the design of conventional cash registers during production by replacing the input/output unit 18 and adding the limit display unit 22. All of the components and functions described herein can also be incorporated into a single machine, without departing from the scope of the invention. More particularly, as shown in FIG. 1, the limit indicating unit 22 is connected by a cable 24 to the input/output section 18 of the cash register 16. In the detailed description of the components and information flow as set forth in the description of FIGS. 3 and 4 below, the limit indicating unit contains its own data processing capability which receives input from the input/output unit of the cash register. It is within the scope of the present invention, however, for the computations associated with the limit indicating unit to be performed in the main section 16 of the cash register 16 in parellel with, or as an augmentation to, the conventional recording and computation functions performed therein.

Figure 3:
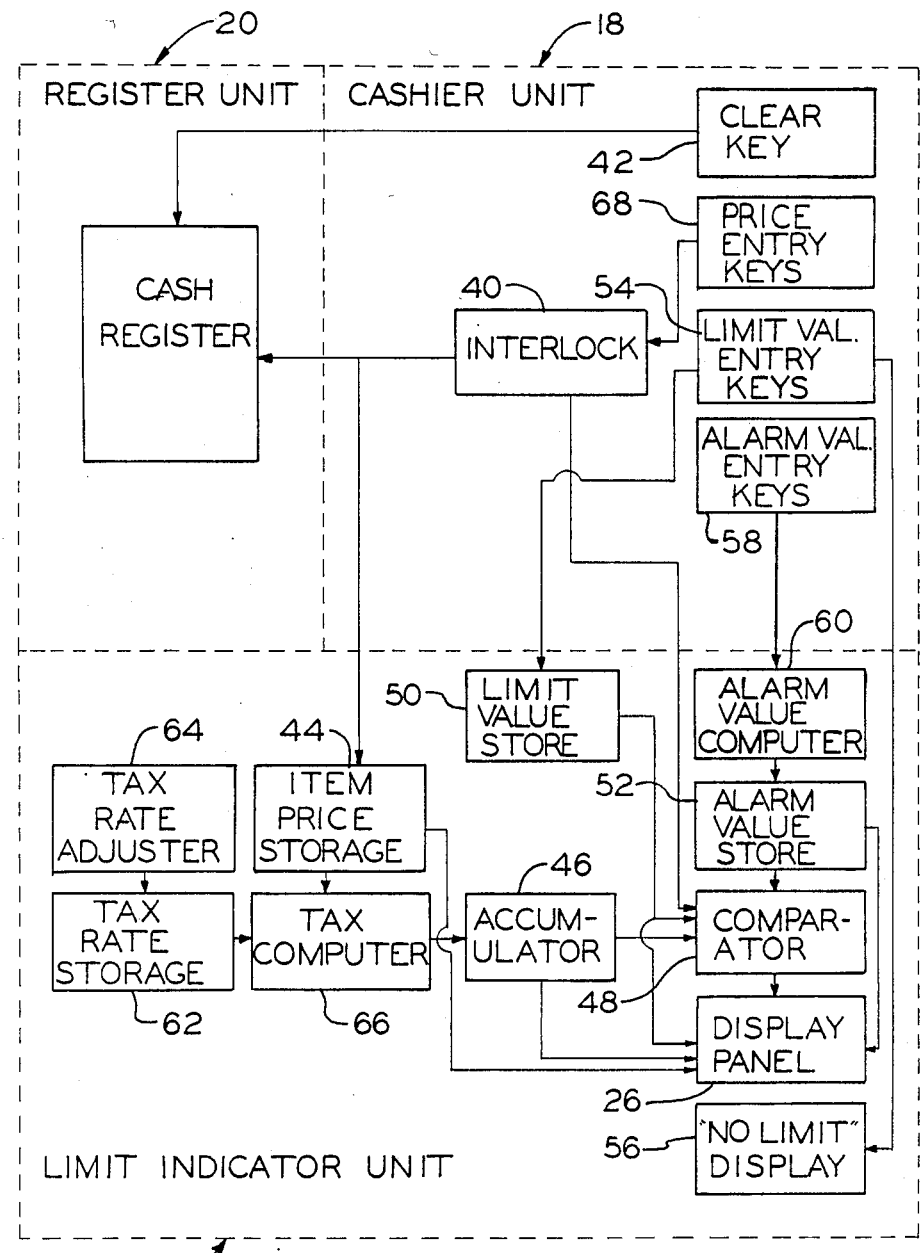
FIG. 3 is a block diagram representing the functional components of the system according to the invention.

Referring now to FIG. 3, there is shown schematically and not by way of limitation, a system in accordance with one embodiment of the invention, having a cashier unit 18, a register unit 20, and a limit indicating unit 22. In this embodiment, the computations and information flow associated with the novel features of the invention are performed in the limit indicating unit 22. Preferably, but not of necessity, an interlock 40 is provided in the cashier unit 18 to assure consistency between certain values or computations performed in the limit indicating unit 22 and similar values or functions performed in the register unit 16. In other embodiments, these computations and functions could be performed in the register unit 16, if the register unit were modified in accordance with the teachings of the present invention.

In a typical cash register, the register unit 20 and the cashier unit 18 are physically embodied in a single machine but this is not necessary, as the cashier unit could be connected by a cable to the register unit, and, in accordance with the present invention, connected by cable to the limit indicator unit. The operation of the register unit will not be described in further detail, since these are well-known and available in a variety of satisfactory embodiments. The register unit 20 records the price of each item to be purchased during a transaction and computes a total bill listing the price of each item, in a tangible form suitable for presentation to the customer. Examples of cash registers adaptable for use with the present invention are described in U.S. Pat. No. 4,319,326 (Uchida), the disclosure of which is hereby incorporated by reference, and U.S. Pat. No. 4,493,037 (Tackano et al), U.S. Pat. No. 4,389,707 (Tsuzaki), U.S. Pat. No. 4,159,533 (Sakurai), and U.S. Pat. No. 3,946,220 (Brobeck et al), and references cited therein.

In FIG. 3, the cashier unit 18 would preferably be a part of the input/output unit shown in FIG. 1. The cashier unit includes a key 42 or the like for clearing the interlock 40 and the data content of the item price store 44, accumulator 46, comparator 48, limit value store 50 and alarm value store 52 contained within the indicator limit unit 22.

The cashier unit 18 also includes limit entry 54 keys or the like which, upon authorization from the customer, are actuated by the cashier to generate a limit value that is placed in the limit store 50. If the customer does not desire a limit, the limit indicator unit could be bypassed by an appropriate logic path in the interlock means, and, preferably, a "no limit" message could appear in the limit value window of the display panel 26 shown in FIG. 2, or a separate signal generator 56 can be used.

If the customer wishes to specify a particular alarm value less than the limit value, the cashier actuates the alarm entry keys 58 which are input to the alarm computer 60 in the limit indicator unit. The alarm computer would preferably have a default value representing a default margin relative to the limit value.

In the limit indicator unit, a constant value must be entered in the tax rate store 62, typically the sales tax to be applied to certain categories of purchased items. Since this value is typically constant for a period of one year or more, it can be preset by means of special tax rate adjustment keys 64 on the limit indicator unit, and then input to the tax computer module 66.

The system having been initialized for a given transaction as described immediately above, the cashier then begins to enter the prices of the individual items by means of the item price entry keys 68 in the cashier unit. Preferably the data signals generated by entry of the price information pass through an interlock before the signals change any of the data stored in the limit indicator unit. Although the interlock could be provided for a variety of purposes, its primary purpose is to prevent additional price entries into the register unit 20 after the limit value has been reached in the limit indicator unit 22.

It the interlock is clear, the item price information is placed in the item price store 44. If the information on the item price carries a code indicating that the item is taxable, a tax adjustment is made in the tax computer 66 and the resulting total price of the item is placed in the accumulator 46. The accumulator provides the accumulated value to the display panel 26, which also receives values from the limit store 50 and the alarm value from the alarm value store 52. The comparator 48 accesses the limit value from the limit store and the alarm value 52 from the alarm store, and compares the accumulated value against these values. When the accumulated value equals the alarm value, an alarm light or other indication is acutated, and similarly when the limit value is reached, a limit light is actuated. So long as the accumulator value is less than the limit value, an output signal from the comparator keeps the interlock in an open condition.

Figure 4:
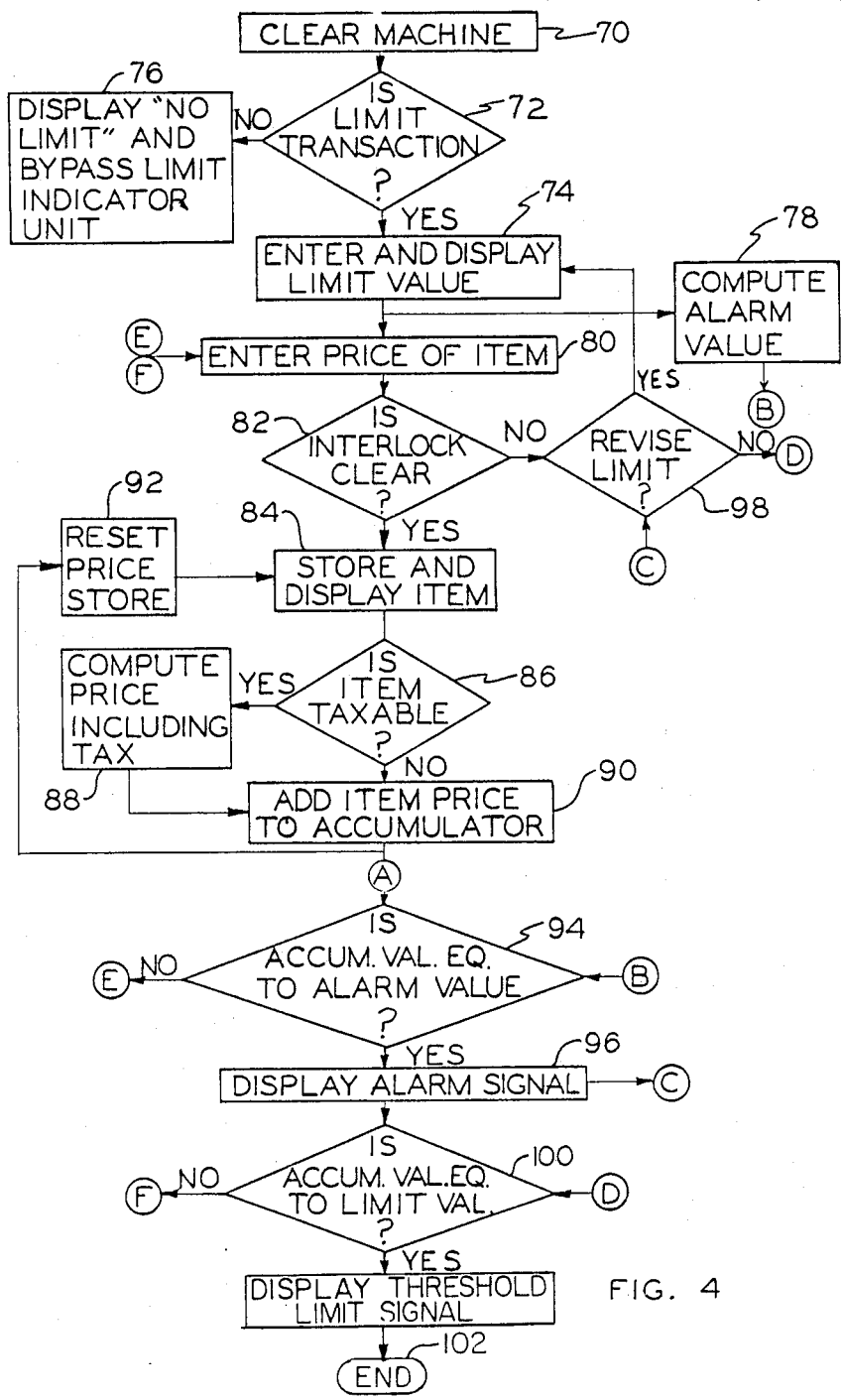
FIG. 4 is a flow diagram illustrating the logic associated with the operation of the system represented in FIG. 3.

FIG. 4 is a schematic flow diagram summarizing the information flow and logic associated with the embodiment of the invention illustrated in FIG. 3. In block 70 the cashier clears the machine and in block 72 the cashier asks the customer whether this transaction is to include a limit value. If this is a limit transaction, the customer states the limit and the cashier enters the limit value in block 74. If there is no limit, the limit indicator unit can be bypassed at 76. The limit is then displayed and the limit value is sent to the alarm value computer where, in this example, the default margin or set point is established at block 78. As the customer places items on the conveyer the cashier enters the individual price of a given item into the cashier unit as represented in block 80. If the interlock is clear at 82, the price is placed in the register unit at 84. At block 86, if the item is taxable an adjustment computation is made at 88, and the total amount for the item is added at block 90 to the previously accumulated total, and the accumulated amount is displayed. The storage location for the price data of an individual item is then reset at block 92. At decision block 94, the accumulated value is then compared with the alarm value. If the alarm value is reached, an alarm signal is displayed at block 96. The cashier can then request at 98 whether the limit should be revised. If the customer wishes to revise the limit, this is done in block 74. If the limit is to remain the same, in block 100 it is determined whether the limit has been reached. If so, the transaction is concluded at 102 and the interlock is closed. If the limit has not been reached, another item is entered and the procedure again proceeds from block 80.

It may be appreciated that the present invention can be implemented in a variety of embodiments and with less than all of the preferred features, without departing from the scope of the claims appended hereto. For example, not all of the information displayed in the panel depicted in FIG. 2 is absolutely necessary. Also, the alarm value could be a constant value, say five dollars less than the limit value without the option for the customer to specify the alarm value.

I claim:

1. A cash register system comprising:
 a register unit including means for recording the price of each of a plurality of items to be purchased during a transaction and computing a total bill suitable for presentation to the customer at the end of the transaction;
 a cashier unit including means for generating a signal indicative of a limit value equal to the maximum authorized total bill for an individual customer in a given transaction, means operatively connected to the register unit for generating a signal indicative of the price to be recorded for each item to be purchased during said transaction, means for generating a signal indicative of the taxability status of an individual item, and means for generating a margin signal commensurate with a margin desired by the customer for a given transaction relative to said limit value;
 a limit indicating unit coupled to the cashier unit, including means responsive to said means for generating a signal indicative of the price to be recorded and to said means for generating a signal indicative of the taxability status of an individual item, for computing an accumulated value of the prices including tax of the items to be recorded in the register unit, means responsive to said limit value signal and said margin signal for storing an alarm value less than the limit value, means for comparing the alarm value with the accumulated value, means for generating a first humanly perceptible signal when the accumulated value is at least equal to the alarm value, means for comparing the accumulated value to the limit value, and means for generating a second humanly perceptible signal when the accumulated value equals or exceeds the limit value.

2. The cash register system of claim 1, wherein said means for generating first and second humanly perceptible signals include a panel having means for displaying the limit value, means for displaying the alarm value, and means for displaying the accumulated value.

3. The cash register system of claim 1 wherein said limit indicator unit further includes means responsive to said means for generating a signal indicative of the price to be recorded for each item, for displaying the price of each item as said price is added to the accumulated value.

4. The cash register system of claim 1, wherein said cash register system is located in a market checkout area immediately adjacent conveyor means for transporting items from a first position accessible to a customer to a second position accessible to a cashier, and wherein said means for generating a humanly perceptible signal displays said signal at one or more locations that are perceptible simultaneously by persons standing at said first and second positions.

5. The cash register system of claim 1 further including interlock means operatively connected among said means for generating a signal indicative of the price of an item, said register unit, and said means for comparing the accumulated value to the limit value, for preventing the recording of the price of an item in the register unit when the accumulated value exceeds the limit value.

6. The cash register system of claim 1 wherein said system further includes means for decoupling the limit indicator unit from the register unit and the cashier unit when the limit value is infinite.

* * * * *